United States Patent [19]
Elson

[11] Patent Number: 4,939,434

[45] Date of Patent: Jul. 3, 1990

[54] APPARATUS AND METHOD FOR AUTOMATIC GARAGE DOOR OPERATION

[76] Inventor: Alfred A. Elson, 1440 NW. 28 Ave., Delray Beach, Fla. 33445

[21] Appl. No.: 357,811

[22] Filed: May 30, 1989

Related U.S. Application Data

[63] Continuation-in-part of Ser. No. 215,232, Aug. 17, 1988.

[51] Int. Cl.[5] .......... H02P 1/22

[52] U.S. Cl. .......... 318/285; 318/266; 318/286

[58] Field of Search .......... 318/256, 264, 265, 266, 318/282, 283, 285, 286, 466, 467, 468, 469

[56] References Cited

U.S. PATENT DOCUMENTS

| | | | |
|---|---|---|---|
| 3,617,835 | 11/1971 | Dreher | 318/285 X |
| 4,035,702 | 7/1977 | Pettersen et al. | 318/256 X |
| 4,119,896 | 10/1978 | Estes, III et al. | 318/266 |
| 4,364,003 | 12/1982 | Phipps | 318/266 X |
| 4,404,558 | 9/1983 | Yen | 318/285 X |
| 4,429,264 | 1/1984 | Richmond | 318/266 X |
| 4,463,292 | 7/1984 | Engelmann | 318/285 X |

*Primary Examiner*—Bentsu Ro

*Attorney, Agent, or Firm*—Victor F. Volk

[57] ABSTRACT

Garage door controllers are improved by means to automatically close the doors after a preselected delay time, once they have been opened.

5 Claims, 1 Drawing Sheet

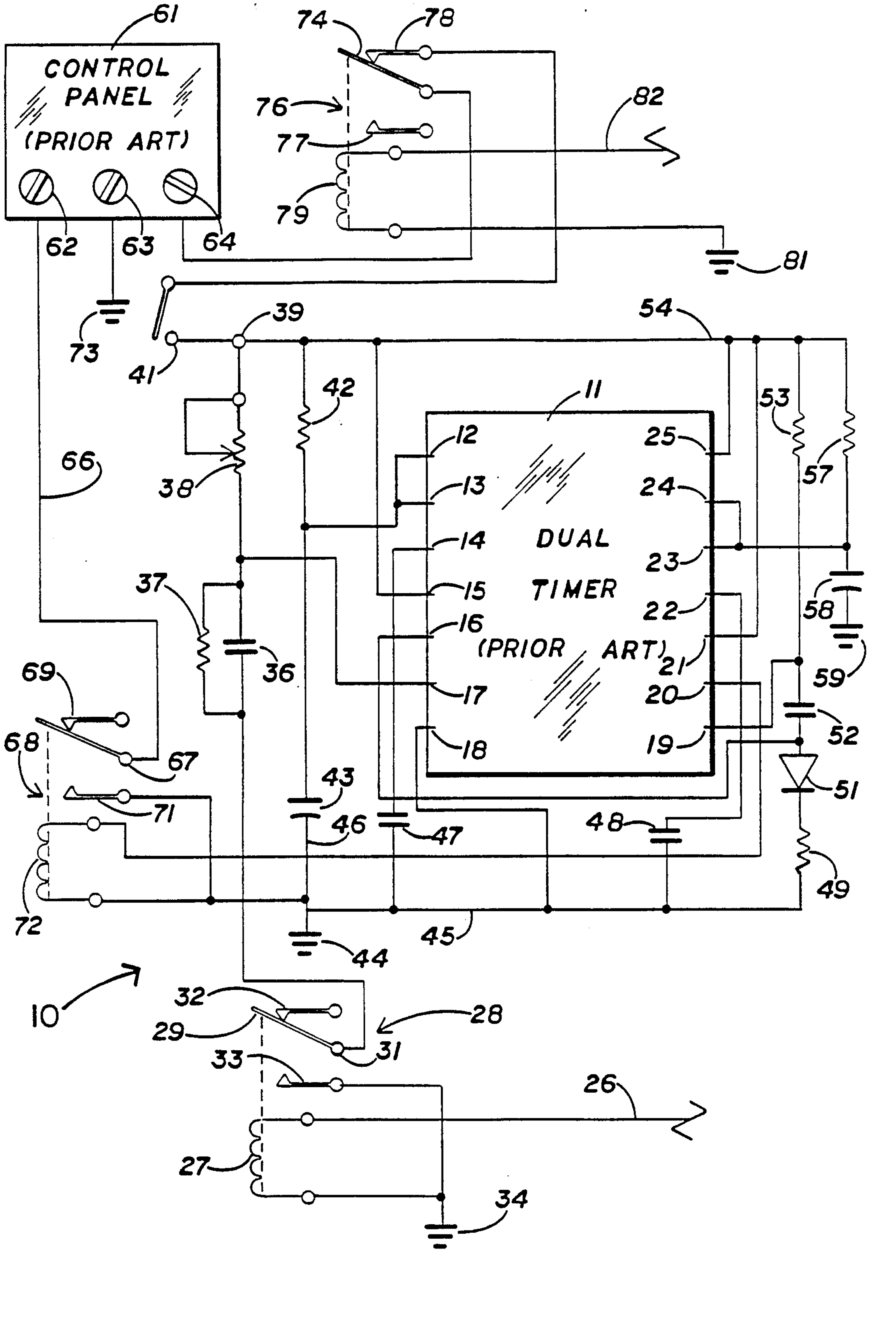
CONTROL PANEL (PRIOR ART)
DUAL TIMER (PRIOR ART)
61
62
63
64
66
67
68
69
71
72
73
74
76
77
78
79
81
82
10
11
12
13
14
15
16
17
18
19
20
21
22
23
24
25
26
27
28
29
31
32
33
34
36
37
38
39
41
42
43
44
45
46
47
48
49
51
52
53
54
57
58
59

APPARATUS AND METHOD FOR AUTOMATIC GARAGE DOOR OPERATION

Continuation-in-part of application Ser. No. 215,232 filed 08/17/88.

BACKGROUND OF THE INVENTION

Electric-motor driven overhead garage doors are in widespread use as are remote controls for such doors which enable a driver to open or close the door without himself getting out of his car. A problem arises when the car is driven away and the driver forgets to signal the door to close; and similarly when he returns to the garage and leaves on foot through an inside door without having closed the overhead garage door.

By means of the present invention a garage door will close automatically after a preselected delay, and a driver is freed from any concern that he may have forgotten to close it.

SUMMARY OF THE INVENTION

The present invention discloses a method of selecting a desired period of time for a garage door to remain open, setting said period of time on an electric timing device, initiating the opening of the door, by means of this initiating step starting the timing device, and, upon the termination of the desired period of time automatically initiating closing the door. Preferably this period of time may extend from about 50 to 190 seconds. Preferably the method comprises the step of automatically deactivating the timing device upon closing the door.

For practicing the above method an apparatus is disclosed that comprises closing circuit means for the door, switching means for supplying current to the closing circuit means, timing means between this switching means and the closing circuit means and means for opening the door with means whereby energizing of the opening means automatically energizes the switching means. Preferably the apparatus also comprises means that automatically disengages the apparatus from a source of current upon the closing of the door and thereby deactivates the switching means. Preferably the timing circuit comprises two cascaded timers and a trigger input such that grounding of the trigger input starts one of the timers which, in turn, starts the other timer.

BRIEF DESCRIPTION OF THE DRAWINGS

The sole FIGURE is a circuit diagram of the apparatus of the present invention.

DETAILED DESCRIPTION OF PREFERRED EMBODIMENT

Referring to the FIGURE a wiring diagram 10 of the invention comprises a commercially known dual, cascaded 556 timer 11, available from Motorola Semiconductor Products, Inc. of Austin, Tex. Suitable equivalent dual timers are also available from other suppliers such as RCA and Texas Instruments. The timer 11 has fourteen terminals: (T1) discharge 12 (T2) threshold 13, (T3) control 14, (T4) reset 15, (T5) output 16, (T6) trigger 17 for one timing circuit; (T7) common ground 18; (T8) trigger 19, (T9) output 20, (T10) reset 21, (T11) control 22, (T12) threshold 23, (T13) discharge 24 for the other timing circuit; and (T14) common voltage connection 25. Here the "T" numbers are those designated on the box of the commercial timer 11. The dual timer 11 also includes two slotted regulators (not shown) for setting the delay periods of the two timing circuits. A lead 26 is connected to any appropriate contact (not shown) in the known door operating system that becomes energized only when the door opening mechanism is switched on. The lead 26 connects to the solenoid coil 27 of a relay 28 having a blade 29 with a terminal 31. A contact 32 of the relay 28 is not connected and a contact 33 connects to a ground 34. The terminal 31 leads to a 0.005 mf condenser 36 in parallel with a 17000 ohm resistor 37 and thence to the trigger terminal 17 and to a variable 22000 ohm resistor 38 and a terminal 39 of a manual switch 41 that is normally closed. The terminal 39 connects also through a 1-megohm resistor 42 to the timer terminals 12 and 13 and, through a 100 mf condenser 43 to a ground 44. A lead 46 between the condenser 43 and the ground 44 is connected by means of another lead 45 through a 0.05 mf condenser 47 to the timer terminal 14, directly to the timer terminal 18 and, through a 0.05 mf condenser 48 to the timer terminal 22. The lead 45 continues through a 450 ohm resistor 49 and diode 51 to the timer terminal 16, a 0.05 mf condenser 52, the timer terminal 19, a 22000 ohm resistor 53 terminating in a lead 54 from the terminal 39. The lead 54 also connects through a 1-megohm resistor 57 and 100 mf condenser 58 to a ground 59 and to the timer terminals 23, 24.

A control panel 61 with three manual switches 62, 63, 64 controls a lead 66 from the switch 62 to a blade 67 of a relay 68 in which a contact 69 is not connected and a contact 71 connects to the ground 44. A contact 71 is grounded to the ground 44 while a solenoid coil 72 of the relay 68 is connected between the output terminal 20 of the second timing circuit of the cascaded timers 11 and the ground 44. The control panel 61 is an element in a known type of garage door opener available from the Sears Roebuck Company #1c2626 comprising circuit means for opening and closing said door. (Other such garage door openers and closers are commercially available to which the present invention can be applied in an equivalent manner.) The garage door opener system of the panel 61 has a safety feature, some version of which is commonly used, that interrupts the door closing if the door encounters any obstruction, and, indeed, the system should be used only with systems having this feature. The switch 63 connects to a ground 73 and the switch 64 to a blade 74 of a relay 76 of which one contact 77 is not connected and the other terminal 78 leads through the normally closed manual switch 41. A coil 79 of the relay 76 is grounded at one end at the ground 81 and has the other end connected through a lead 82 to a contact in the door closing circuit that is energized when the door is closed thus opening the switch of the relay 76 and shutting off any potential from the control panel 61 to the dual timer 11. Appropriately, the lead 82 is connected to a commerically available Sears RCVR/Logic Board #2618, specifically to the same side of R27 of that board (not shown) as energizes the coil 79.

In operation switches 64 and 41 are normally closed and switches 62 and 63 are open and the blades of the relays 76, 68, and 28 are in the positions shown in the FIGURE. When the door opening mechanism is energized, current passes into the lead 26 grounding the terminal 31 and thus the trigger 17 and in turn the trigger 19 of the cascaded timer 11. Thus when the door is energized to open, the timing circuit of trigger 17 acts as a momentary switch to actuate the timing circuit of trigger 19 which then begins a timing cycle with a time delay of 165 seconds. A single timer can not act as a momentary switch type relay circuit and timer relay control. It is found this delay time to be optimum, after which energy is supplied to the output terminal 20 and thus through the coil 72 of the relay 68 causing the relay to ground the lead 66 and energize the door closing mechanism (not shown) of the door operating apparatus. When the door closes, however, the line 82 is energized passing current through the coil 79 so that the relay 76 cuts off the timer 11. This prevents the door from automatically opening and closing repeatedly. However the timer must be interrupted only when the door is closed prior to the end of a timing cycle.

While the greatest utility of the invention is believed to result from the use of remote control operation of the door mechanism it does also have application to occasions when the door is open by manual switching, since the line 26 will be energized in this case also, as when a person desires to walk out through the garage door. If he wishes to keep the door open he needs merely to open the switch 41.

The foregoing description has been exemplary rather than definitive of the invention an award of Letters Patent for which is requested as defined in the appended claims.

I claim:

1. An apparatus for automatically initiating the closing of a garage door after a preselected time of delay comprising:

(A) closing circuit means for said door, (B) switching means for supplying current to said closing circuit means, (C) timing means connected in series between said switching means and said closing circuit means, said timing means comprising cascaded timers and a trigger input wherein grounding said trigger input energizes one of said timers which then starts another of said timers, (D) means for opening said door, said opening means automatically energizing said switching means.

2. The apparatus of claim 1 further comprising means for automatically disengaging said apparatus from a source of current upon closing of said door, thereby deactivating said switching means.

3. The method of operating a garage door comprising the steps of:

(A) preselecting a desired period of delay, (B) initiating the opening of said door, (C) automatically, by means of said initiating step of opening, grounding a trigger input and thereby energizing one of a pair of cascaded timers to start the other of said pair of timers, (D) by means of said other of said pair of timers, upon the termination of said period of delay, automatically initiating the closing of said door.

4. The method of claim 3 further comprising the step of automatically deactivating said timers upon closing said door.

5. The method of claim 3 wherein said period of delay is between about 50 and 190 seconds.

* * * * *